US005883468A

United States Patent [19]
Hobbs et al.

[11] Patent Number: 5,883,468
[45] Date of Patent: Mar. 16, 1999

[54] TUNGSTEN HALOGEN LAMP WITH SPECIFIC FILL MATERIAL, FILL PRESSURE, AND FILAMENT COIL PARAMETERS

[75] Inventors: Bonnie J. Hobbs, Marquette, Mich.; Paul A. Young, Weare, N.H.; Stuart K. Denham, Waldboro, Me.

[73] Assignee: Osram Sylvania Inc., Danvers, Mass.

[21] Appl. No.: 899,621

[22] Filed: Jul. 24, 1997

[51] Int. Cl.⁶ .................................................. H01K 1/50
[52] U.S. Cl. .......................... 313/579; 313/580; 313/623; 313/631
[58] Field of Search .................................... 313/579, 580, 313/623, 624, 631

[56] References Cited

U.S. PATENT DOCUMENTS

| | | | |
|---|---|---|---|
| 4,553,066 | 11/1985 | Fields et al. | 313/579 |
| 4,591,752 | 5/1986 | Thouret et al. | 313/579 |
| 4,683,397 | 7/1987 | Johnson | 313/579 |
| 5,473,226 | 12/1995 | Beschle et al. | 313/579 |

Primary Examiner—Vip Patel
Attorney, Agent, or Firm—William E. Meyer

[57] ABSTRACT

A long life, two filament tungsten halogen lamp having light transmissive envelope, a first filament with a first lead, second lead, filament coil; a second similar filament, and a fill material is disclosed. The filament coil has an increased wire weight, increased over what is commonly used. The fill material comprises a halogen for the tungsten halogen cycle, a getter, and the remainder is approximately equal portions of krypton and xenon. The basic life improvement comes from the heavier tungsten wire weight, combined with the heavier molecular weight of xenon and krypton. The new filament and fill gives a two filament tungsten halogen lamp yielding substantially longer lamp life.

12 Claims, 3 Drawing Sheets

TUNGSTEN HALOGEN LAMP WITH SPECIFIC FILL MATERIAL, FILL PRESSURE, AND FILAMENT COIL PARAMETERS

TECHNICAL FIELD

The invention relates to electric lamps and particularly to tungsten halogen lamps. More particularly the invention is concerned with a long life, two filament tungsten halogen vehicle lamp with substantial fill components of krypton and xenon.

BACKGROUND ART

Head lamps should last as long as possible in operation. There are however other requirements that must be met. Cost of the lamp is one consideration. The lamp must produce the necessary amount of light to properly illuminate the road. The light must be spread according to prescribed patterns, so the illuminating source structure must work with existing reflectors and lenses to reproduce the proper patterns. Head lamps require a substantial amount of power and this demand may influence the overall system requirement. To lower the overall cost of the electrical system, lower power requirements for vehicle headlamps is a desirable result. Currently, daylight running headlamps are becoming a recognized safety feature. Running headlamps constantly does not result on average in more lamp failures per lamp hour, but does result on average in more lamp failures per vehicle running hour. There is then a need for increased vehicle headlamp life, without substantially effecting lamp cost, light output or distribution, or vehicle power system

DISCLOSURE OF THE INVENTION

A long life tungsten halogen vehicle lamp capsule may be formed from a light transmissive envelope having a wall defining an enclosed volume, a first filament having a first lead passing in a sealed fashion through the envelope wall into the enclosed volume, a second lead passing in a sealed fashion through the envelope wall into the enclosed volume, a filament coil located in the enclosed volume and mechanically supported and electrically coupled between the first lead and the second lead; and a fill material comprising a substantial portion of krypton, a substantial portion of xenon, and a halogen component.

BRIEF DESCIPTION OF THE DRAWINGS

BEST MODE FOR CARRYING OUT THE INVENTION

Figure 1:
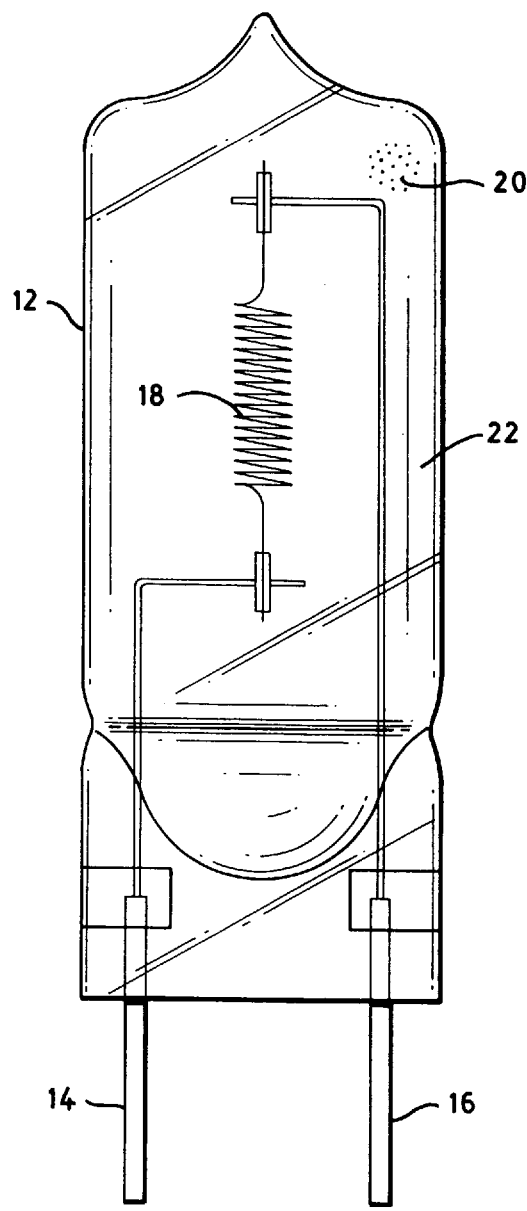
FIG. 1 shows a cross sectional view of a preferred embodiment of a long life tungsten halogen lamp capsule.

FIG. 1 shows a preferred embodiment of a long life tungsten halogen lamp 10. Like reference numbers designate like or corresponding parts throughout the drawings and specification. The long life tungsten halogen lamp 10 is assembled from a light transmissive envelope 12, a first lead 14, a second lead 16, filament coil 18, and a fill material 20.

The light transmissive envelope 12 may be made out of hard glass, such as an aluminosilicate glass, or quartz to have the general form of a hollow tube closed at both ends. The light transmissive envelope 12 has a wall that defines an enclosed volume 22; a seal for a first lead 14, and a seal for a second lead 16. The preferred wall is a circular cylinder with a tipped top end and a press sealed bottom end. Positioned between the tipped end, and the press sealed end is the enclosed volume 22. It is understood that the lamp 10 could be made as a double ended lamp 10; however, to avoid optical interferences, the preferred embodiment is a single ended, press sealed lamp 10 with the first seal and the second seal being combined as the press seal.

The first lead 14 may be made out of tungsten, molybdenum or nickel plated steel rod to have the general form of a straight rod. The second lead 16 may be similarly composed. Each lead 14, 16 has an exterior end, a seal portion, and an interior end. The exterior end is designed to receive electrical and mechanical couplings on the exterior of the lamp. The seal portion is designed to seal with the envelope 12 so as to not release the fill material 20, or to admit the exterior air and moisture. The interior end is designed to support an end of a filament coil 18 structure. The preferred interior end is adapted for direct welding to a small sleeve enclosing, and holding the filament coil leg 18. Alternatively, the interior end may be a folded over wire end that can be closed on a filament coil 18 leg to electrically couple to and hold the filament coil 18 leg in place. The second lead 16 may be made to have the same general form as the first lead 14 to thereby similarly support and couple to a second end of the filament coil 18. The leads then enter the light transmissive envelope 12 from the exterior, form seals with the envelope 12, here the single press seal, to enter the enclosed volume 22.

Figure 2:
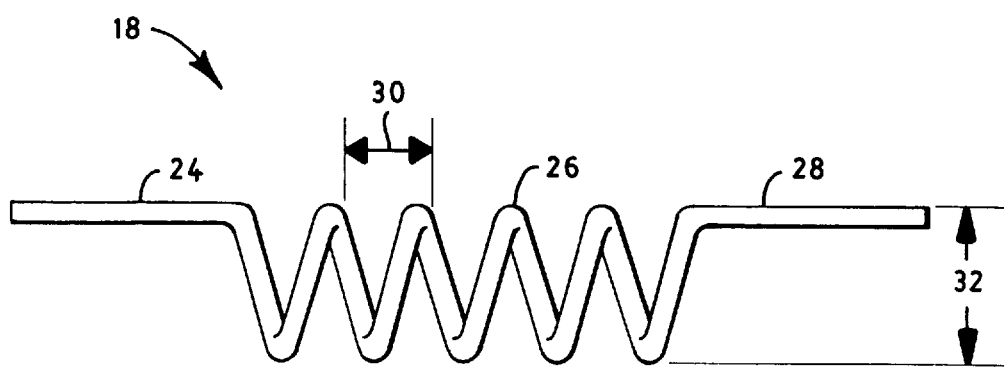
FIG. 2 shows a filament and its supporting leads.

FIG. 2 shows a filament and its supporting leads. The filament coil 18 may be made out tungsten wire to have the general form of a coiled, or coiled coiled tungsten wire with in order a first leg 24, a coil 26, and a second leg 28. The coil 26 is then supported by the legs ends 24, 28 Coils are measured in wire weight per 200 millimeters of wire, with a common weight for vehicles being about 85 mg. An increase in wire weight by five percent was found to increase lamp B10 life by as much as fifty percent. Filament coils have a pitch 30, with a common value being about 185 percent. Coil pitch is defined as the ratio of the overall distance between similar points on successive turns (the wire diameter plus the space between turns) divided by the wire diameter and expressed as a numerical percentage. A a decrease in filament coil pitch by eight percent, was found to increase lamp 10 life by as much as fifty percent. While heavier filament coil wire performed better in vibration testing, a limit was reached. The same limit was found to be true for filament coil pitch 30. Filament coils that had a decrease in pitch by fifteen percent, from 185 to 155 showed the most static life, but did not fair well in vibration testing. The filament coil also has a diameter 32 that affects its optical image size. To be functional in existing headlamp systems the coil diameter 32 should remain nearly constant, but this constrains other possible changes.

Figure 3:
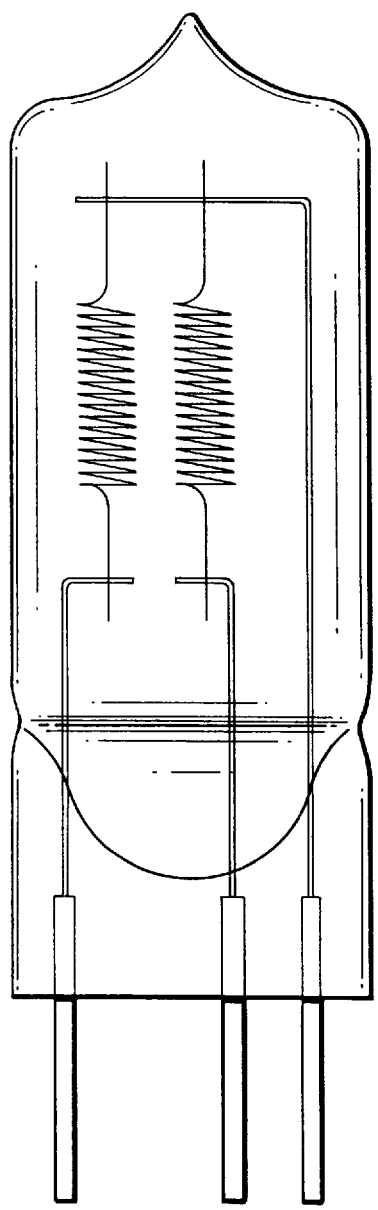
FIG. 3 shows a two filament lamp capsule.

FIG. 3 shows a two filament lamp. In the preferred embodiment, if a second filament is used, the second filament is formed in a similar fashion with similar dimensions as the first filament.

The fill material 20 may be made with a krypton component, a xenon component, a halogen component, and other gases and various additives, such as phosphine, as are known in the art. The envelope 12 encloses the fill material 20 in the enclosed volume 22. The filament coils are then surrounded by the fill material 20. The fill material 20 includes a halogen component to enable the tungsten halogen cycle to occur. Various halogen components are known. The preferred halogen component is bromine. The fill material 20 may also include a small amount of a getter material, such as phosphine. The phosphine component acts as a getter to help remove any residual oxygen, or water in the enclosed volume 22. The remaining fill mixture, 99% or more, is made of krypton and xenon.

Krypton is an inert gas frequently used in vehicle lamps. Xenon is another inert gas, but it is expensive, presently about eight times the cost of krypton, and is not commonly used in filamented vehicle lamps. The xenon has been found to increase both lamp lumens and lamp life; however, due to its low ionization potential xenon can lead to filament coil shorting (coil to coil or filament to filament), particularly in lamps with two or more filaments. Xenon as a fill gas component has been found to lower the resistance of the fill gas, and xenon therefore has increased the likelihood of shorting between filament coils. When a lamp shorts between filaments, one or both of the coils are destroyed, and the lamp at fails or at least partially fails. Filament failures in a headlamp are clearly undesirable.

The effects of relative proportions of krypton and xenon were found to produce a non-linear relationship between lumens per watt and total lumens and the percent of xenon in the fill gas. These relationships peaked at about 30 to 35 percent xenon, with a corresponding increase in lumens of about 4 percent. A reasonable range of xenon to use is then from 35 to 60 percent. Given the expense of xenon, the preferred mixture was half krypton and half xenon, referred to here as a 50/50 mixture making up about 99 percent of the fill, the remainder being the halogen and the getter. It was expected that with the inclusion of xenon in the lamp fill, the life of the lamp would decrease due to the likely increase in filament shorting. Empirical testing lead to the discovery that the inclusion of xenon in the specified ranges did not adversely affect the lamp performance, and that in fact the quality, and life of the lamp increased with the xenon and krypton fill.

The increase in lumens due to the xenon fill component can be traded for additional lamp life. The significance here is that while increasing wire weight would normally increase the lamp life, the heavier wire weight would also reduce lumen output, and increase the current level. Small changes in wire weight would also change the coil size, thereby affecting the optical image, and the resulting beam patterns. Each of these factors could take the lamp out of specification, making it unacceptable for existing headlamp systems. The Applicants solution increases lamp life and stays within the remaining lamp specifications. The discovery that the addition of xenon could be added to krypton, without an increase in filament shorting, enabled the induced higher lumen output due to xenon to be used to offset the lumen loss due to the heavier wire. Reshaping the coil, preserved the optical image, thereby offsetting the shape change due to the change in wire size. The interactions between the parameters that give the dramatic increase in lamp life while otherwise maintaining lamp specifications was not apparent from individual characteristics.

In a working example some of the dimensions were approximately as follows: The light transmissive envelope was made of a standard 9007 vehicle capsule made of aluminosilicate hard glass. The leads were made of nickel plated steel rods. There were two filaments to allow for low and high beam operation. The low beam had a 1895 coil (internal company designation) with a 184 percent pitch, and a heavier wire weight of 90.52 mg as compared to the normal wire weight of 85.3 mg as used in a standard 9007 vehicle headlamp. The coil had an outside diameter of 1.5088 millimeters (0.0594 inches), and had 17 turns for an overall coil length of 5.40 millimeters (0.212 inches). The lamp was filled with a halogen, a phosphine getter and a 50/50 xenon krypton gas fill to a pressure of 8 atmospheres. The average life for a control group of standard 9007 lamps was 780 hours, while that for the 1895 coil in the 50/50 xenon krypton fill was increased to 1816 hours. This amounts to 132% increase in lamp life. The 1895 coil passed all design, verification and plan (DVP) tests. The nominal lamp wattage was increased slightly, but remained in the required range of 50 to 60 watts. Nominal lumens dropped from 950 lumens to 900 lumens which is also within specification limit (854 to 1156 lumens) for the 9007 lamp. Lamp life increased from a B10 (a ten percent statistical failure measure) of 500 hours to a B10 of 1200 hours, for an increase in lamp life of 140%, while otherwise complying with all lamp specifications. The disclosed dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A tungsten halogen vehicle lamp capsule comprising:
   a) a light transmissive envelope having a wall defining an enclosed volume,
   b) a first filament having
      i) a first lead passing in a sealed fashion through the envelope wall into the enclosed volume,
      ii) a second lead passing in a sealed fashion through the envelope wall into the enclosed volume,
      iii) a filament coil located in the enclosed volume and mechanically supported and electrically coupled between the first lead and the second lead; and
   c) a fill material comprising a substantial portion of krypton, a substantial portion of xenon, and a halogen component.

2. The lamp in claim 1, wherein the filament coil has a wire weight of about 90 milligrams.

3. The lamp in claim 1, wherein the filament coil has a pitch of 184 percent.

4. The lamp in claim 1, wherein the filament coil has a diameter of 1.5088 millimeters.

5. The lamp in claim 1, wherein the filament coil has an overall coil length (excluding legs) of 5.4 millimeters.

6. The lamp in claim 1, wherein the fill has a pressure of 8 atmospheres.

7. The lamp in claim 1, further including a second filament similar to the first filament.

8. The lamp in claim 1, wherein approximately equal portions of krypton and xenon are present.

9. The lamp in claim 1, wherein the halogen comprises less than about 1 percent of the total fill material.

10. The lamp in claim 3, wherein, a mixture of equal portions of krypton and xenon makes up about 99 percent of the fill material, with the remaining approximately 1 percent of the fill material being halogen and other components.

11. A long life, two filament tungsten halogen lamp comprising:
    a) a light transmissive envelope having a wall defining an enclosed volume, a first seal, and a second seal;
    b) a first filament having
       i) a first lead, coupled from an exterior through the first seal to enter the enclosed volume, having an exterior end, a seal portion, and an interior end;

ii) a second lead, coupled from the exterior through the second seal to extend into the enclosed volume, having an exterior end, a seal portion, and an interior end;

iii) a filament coil, positioned in the enclosed volume, and electrically coupled between the interior end of the first lead and the interior end of the second lead, the filament coil having a wire weight of about 90 milligrams, coil a pitch of about 184 percent, coil a diameter of about 1.5 millimeters, and an overall coil length (excluding legs) of about 5.4 millimeters;

c) a second filament located in the enclosed volume; and, d) a fill material, positioned in the enclosed volume having a gas mixture component of xenon and krypton with 30 to 60 percent being xenon, and the gas mixture component comprising about 99% or more of the fill material, the remainder of the fill mixture including a halogen component, and a getter component, with a cold pressure of 8 atmospheres or more.

12. A long life, two filament tungsten halogen lamp comprising:

a) a light transmissive envelope having a wall defining an enclosed volume, a first seal, and a second seal;

b) a first filament having i) a first lead, coupled from an exterior through the first seal to enter the enclosed volume, having an exterior end, a seal portion, and an interior end;

ii) a second lead, coupled from the exterior through the second seal to extend into the enclosed volume, having an exterior end, a seal portion, and an interior end;

iii) a filament coil, positioned in the enclosed volume, and electrically coupled between the interior end of the first lead and the interior end of the second lead;

c) a second filament located in the enclosed volume; and, d) a fill material, positioned in the enclosed volume having a gas mixture component of xenon and krypton with 30 to 60 percent being xenon, and the gas mixture component comprising about 99% or more of the fill material, the remainder of the fill mixture including a halogen component, and a getter component, with a cold pressure of 8 atmospheres or more.

* * * * *